United States Patent [19]

Berchtold et al.

[11] Patent Number: 4,728,494

[45] Date of Patent: Mar. 1, 1988

[54] SPECTACLE FRAMES MADE OF NI ALLOY

[75] Inventors: Lorenz Berchtold, Hanau; Gernot Jäckel, Hasselroth, both of Fed. Rep. of Germany

[73] Assignee: Degussa Aktiengesellschaft, Frankfurt am Main, Fed. Rep. of Germany

[21] Appl. No.: 813,825

[22] Filed: Dec. 27, 1985

[30] Foreign Application Priority Data

Jan. 10, 1985 [DE] Fed. Rep. of Germany ....... 3500554

[51] Int. Cl.⁴ ............................................. C22C 19/03
[52] U.S. Cl. .................................................. 420/457
[58] Field of Search ........................ 420/457; 148/429; 29/20; 351/102, 154

[56] References Cited

U.S. PATENT DOCUMENTS 1,572,744  2/1926  Merica ................................. 420/457

FOREIGN PATENT DOCUMENTS 3040054  5/1981  Fed. Rep. of Germany .
3045334  9/1981  Fed. Rep. of Germany .
3340054  8/1984  Fed. Rep. of Germany .

*Primary Examiner*—R. Dean
*Attorney, Agent, or Firm*—Cushman, Darby & Cushman

[57]     ABSTRACT

Zinc-free nickel alloys for spectacle frames and spectacle parts are described which in addition to very good corrosion properties also show good shaping properties. In addition to nickel, they contain 5 to 20% copper, 2 to 6% aluminum, 0 to 1% beryllium, and up to 0.5% carbon.

8 Claims, No Drawings

SPECTACLE FRAMES MADE OF NI ALLOY

BACKGROUND OF THE INVENTION

The invention is directed to the use of nickel alloys for spectacle frames and other spectacle parts.

Spectacle frames and spectacle parts are prepared and frequently prepared from metals or metal alloys. Thereby, there are used chiefly copper alloys, such as, e.g., tin bronze (CuSn 6, CuSn 8), copper bronze (Cu 82 Ni 2 Sn 5, Zn 11) and German silver or nickel alloys, which alloys are characterized by good workability but have a high susceptibility to corrosion so that the spectacle parts made of these materials must be provided with coatings of nobler metals or alloys. However, the use of such clad metals is unsatisfactory since even the smallest pores in the coating of the carrier material permit corrosion and spectacles in use are subject to an abrasive wear, which after some time exposes the non-noble carrier materials.

Recently, there have been proposed for spectacle parts nickel-chromium and nickel-chromium-silver alloys (German OS No. 3045334), which are characterized by a good resistance to corrosion but have workability problems. Thus, e.g., a nickel alloy containing 10–15% chromium has only poor machinability since it is inclined to weld to the tool. The machinability can be improved by the addition of about 1% silver to the nickel-chromium but this is purchased at a higher material cost and a difficult working technique.

The non-machining shaping with these materials also is difficult since both types of materials (Ni-Cr, Ni-Cr-Ag) show a very steep work hardening characteristic with increasing degree of deformation and thus must be annealed repeatedly. Besides the shaping can be carried out only with special rolls and special drawing nozzles.

Alloys which exhibit good resistance to corrosion and good working properties are mentioned in German patent 3340054. They contain as the chief components nickel, copper, and zinc. Because of their high melting points of over 1300° C. and the content of 8–25% of easily vaporizable zinc, the production of these alloys is difficult.

Therefore, it was the problem of the present invention to develop nickel alloys for spectacle frames and other spectacle parts, e.g., hinges and screws, which besides good resistance to corrosion and good workability also present the possibility of being produced in a simple manner.

SUMMARY OF THE INVENTION

This problem was solved according to the invention by using nickel alloys which besides nickel contain as the remainder 5 to 20% copper, 2 to 6% aluminum, 0 to 1% beryllium, and 0 to 0.5% carbon.

Preferably, the alloys contain 9 to 14% copper and 2.5 to 5% aluminum.

The nickel-copper-aluminum alloys have a very good resistance to corrosion and a very good processability. The optional additives of beryllium and carbon improve the elastic properties of the alloys and cause a displacement of the recrystallization temperature to higher temperatures.

The omission of zinc makes the production of these alloys free from problem.

The Al content of 0 to 4% mentioned as an additive to nickel-copper-zinc alloys in German patent 3340054 causes an improvement in the elastic properties, but it does not increase the resistance to corrosion of the basic alloy nickel-copper-zinc.

However, unexpectedly for the zinc-free alloys in the system nickel-copper aluminum, there is formed an increase in the corrosion resistance with the content of aluminum. Especially at aluminum contents of 2.5 to 5% there are obtained good to very good corrosion resistances.

In the table there are set forth the properties of several known spectacle materials (Examples 4–6) and several alloys according to the invention (Examples 1 to 3).

| | Composition (Wt. %) | | | | Stiffening With Cold Forming (Hardness Vickers) | | | |
|---|---|---|---|---|---|---|---|---|
| Example No. | Ni | Cu | Al | Additional Material | Soft | 40% Deformation | 80% Deformation | Means of Fabrication |
| 1 | 84.4 | 11.3 | 4.3 | — | 115 | 235 | 270 | meltable in vacuum |
| 2 | 84.4 | 11.2 | 4.2 | 0.1 Be | 125 | 245 | 285 | meltable in vacuum |
| 3 | 85 | 11.1 | 3.8 | 0.1 C | 140 | 265 | 310 | meltable in vacuum |
| 4 | 78.5 | 10.6 | — | 10.9 Zn | 103 | 210 | 245 | only meltable with |
| 5 | 78.3 | 10.5 | 0.4 | 10.8 Zn | 113 | 220 | 250 | high pressure melting |
| 6 | 78.3 | 10.6 | — | 10.9 Zn 0.2 Be | 118 | 230 | 265 | equipment |

The entire disclosure of German priority application No. P3500554.8 is hereby incorporated by reference.

What is claimed is:

1. A spectacle frame made of an alloy consisting of 5 to 20% copper, 2 to 6% aluminum, 0 to 1% beryllium, 0 to 0.5% carbon and balance nickel.

2. A spectacle according to claim 1 wherein the alloy contains 9 to 14% copper and 2.5 to 5% aluminum.

3. A spectacle frame according to claim 2 wherein the alloy is free from beryllium and carbon.

4. A spectacle frame according to claim 2 wherein the alloy contains beryllium and is free from carbon.

5. A spectacle frame according to claim 2 wherein the alloy contains carbon and is free from beryllium.

6. A spectacle frame according to claim 1 wherein the alloy is free from beryllium and carbon.

7. A spectacle frame according to claim 1 wherein the alloy contains carbon and is free from beryllium.

8. A spectacle frame according to claim 1 wherein the alloy contains beryllium and is free from carbon.

* * * * *